July 3, 1934.   H. H. HOUSTON   1,965,341
METHOD OF MAKING AUTOMOBILE LOADING BLOCKS
Original Filed July 8, 1932
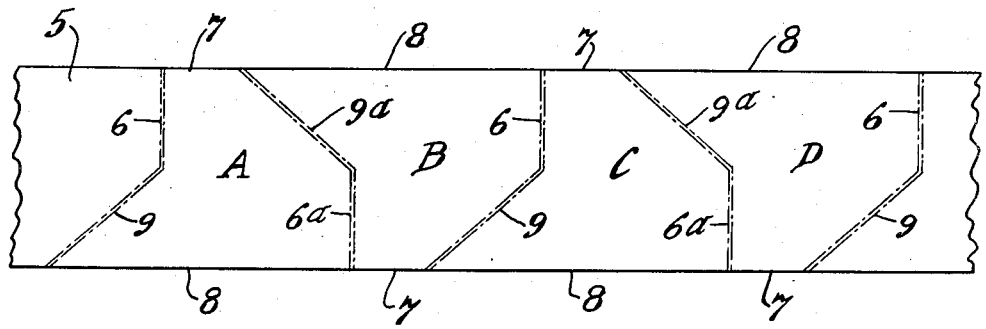
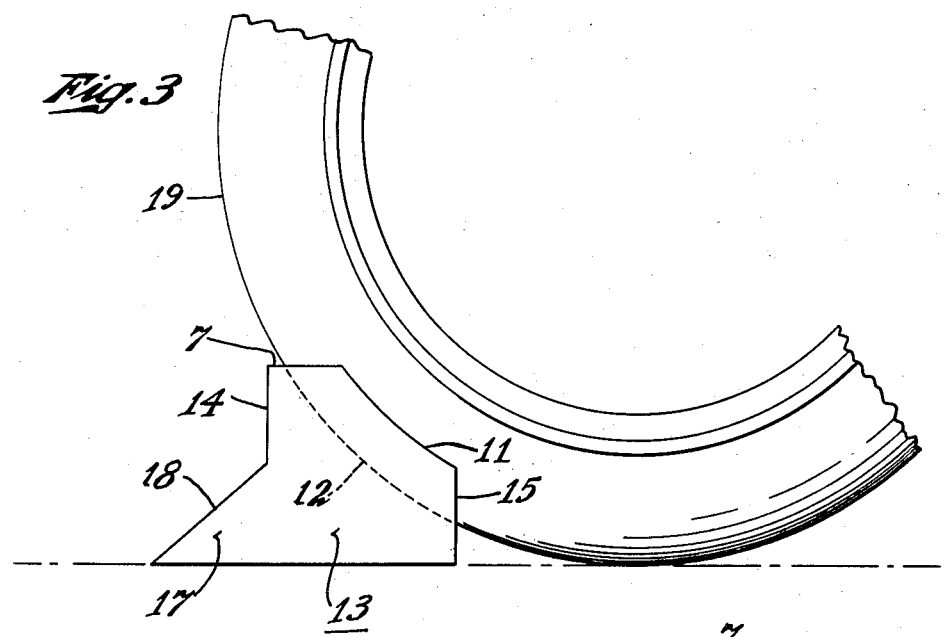
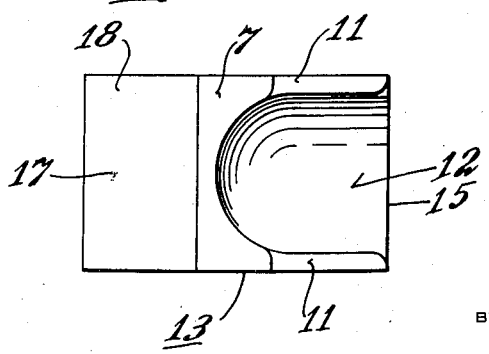
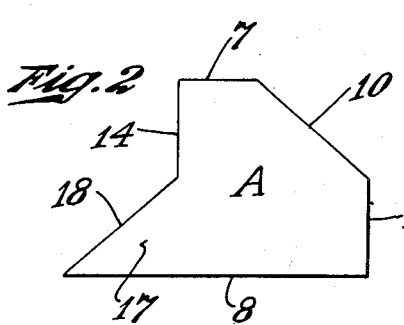
INVENTOR
H. H. Houston
BY
Johnston & Jennings
ATTORNEYS Patented July 3, 1934

1,965,341

UNITED STATES PATENT OFFICE 1,965,341

METHOD OF MAKING AUTOMOBILE LOADING BLOCKS

Henry H. Houston, Montgomery, Ala., assignor to W. E. Foshee, Montgomery, Ala.

Refiled for abandoned application Serial No. 621,495, July 8, 1932. This application April 9, 1934, Serial No. 719,697

7 Claims. (Cl. 144—309)

My invention relates to the art of manufacturing automobile loading blocks of the type which are formed from solid wooden billets sawed from an inclined lumber stock and each provided with an inclined front face, preferably grooved to conform approximately to the tread of the tire of an automobile wheel which the block is designed to hold in position on a railroad car or other loading platform. This application is a substitute of my prior application, Serial No. 621,495, filed July 8th, 1932.

Loading blocks of this character have long been in use and, as they represent elements which are used but once and then discarded, to be commercially successful they must be produced at the lowest possible cost.

I have devised a method of manufacture by which stock, having the width and thickness desired for the block blanks, can most economically and without waste be subdivided by angled crosscuts into billets each forming a roughed block blank which needs only to have its wheel engaging front face grooved to produce the finished block. I propose to form each cross-cut alike by means of two angularly disposed intersecting kerfs, all cross-cuts having their included angle facing towards the same end of the block being sawed but alternate cross-cuts being inverted.

In order to carry out my method in the most approved manner, it is desirable to group the alternate cuts on each side and make all of the cuts of each group at the same time, it being noted that the cuts forming one group have different angular relation to the face of the billet or timber from the cuts of the other group.

It is also distinctive of my improved method of sawing the lumber stock that the block blanks are sawed by angularly arranged intersecting kerfs so that the front face of one block is cut opposite to the heel or back face of the adjoining block, each pair of adjacent blocks as thus defined being relatively inverted so that their bases are formed by opposite sides of the stock.

In order that the manner of sawing out my improved chock block may be fully understood, reference is made to the accompanying drawing, in which:—

Fig. 1 illustrates in full lines lumber stock with the dotted lines showing the intersecting saw kerfs forming the cross-cuts by means of which the block blanks or billets are cut therefrom.

Fig. 2 illustrates one of the block blanks as formed in accordance with my present method.

Fig. 3 shows the finished block grooved and in operative position relative to a wheel.

Fig. 4 is a top plan view looking down on the finished block shown in Fig. 2.

Similar reference numerals refer to similar parts throughout the drawing.

In the practice of my improved method it is contemplated that the block blanks or billets shall be cut from lumber stock such as 5 which will have in transverse cross section a width corresponding to the height of the loading block and a thickness corresponding to the width of the loading block.

The stock 5 is then sawed transversely at right angles to its length by any suitable sawing mechanism so as to provide a series of parallel spaced kerfs 6 which as shown extend approximately to the center of the stock. These kerfs 6 are spaced on centers corresponding to the total length of the top and bottom surfaces of the loading block billet to be produced. This is clearly shown in Fig. 1 where 7 indicates the top face of one billet and 8 the bottom face of the adjacent billet and the spacing therefore between the kerfs 6 will equal the combined length of these faces 7 and 8.

The stock is then turned over and sawed to form a similar series of equi-distant kerfs 6a leading oppositely to the kerfs 6. These kerfs 6a also extend preferably to the center of the stock. These interleaved kerfs 6 or 6a may all be sawed at the same time or successively according to the equipment available.

Oblique kerfs 9 are sawed parallel to each other and disposed each to intersect a kerf 6, and reversely inclined oblique kerfs 9a are sawed from the opposite side of the stock inwardly to intersect with the kerfs 6a. The kerfs 9 and 9a lead from the point of junction to the block faces 7 and 8 representing the top and bottom of each pair of adjacent block billets.

When the stock 5 has been thus sawed the cross kerfs 6, 9 and 6a, 9a produce similar crosscuts which subdivide the stock into billets or blanks designated by the letters A, B, C, and D on Fig. 1, and illustrated in Fig. 2, each billet being identical with the others except as cut it is inverted with respect to the two adjacent billets.

As a result of the sawing operations above described there are produced standard billets or blocks which require no further treatment to produce the finished loading block except when it is desired to cut away their front inclined wheel engaging face 10 (Fig. 2) as indicated in Figs. 3 and 4 to form the concave edges 11 and the tire receiving groove 12. This operation can be performed in the manner well understood in this art if it be desired to produce the blocks with a groove face.

When the billet or block as A (Fig. 2) has had its face 10 thus grooved we have the finished loading block 13 seen in Figs. 3 and 4. It will be observed that this block as shown has inverted parallel upper back and lower front faces 14 and 15, respectively, which are equal in size to about one half of the vertical cross section of the finished block, but it is within the contemplation of my invention that these faces 6 and 9 or 6a and 9a may have any desired angle to the long axis of the block and the grooves 6 may intersect the grooves 9 at either side of the center of the block according to the amount of stock that it may be desired to leave in the front end and heel of the finished block. Obviously as the cuts 6 are elongated they reduce the stock left to form the heels 17 and as the included angle between the grooves 6, 9 is reduced more stock is removed from the back face of the block and transferred to the front face where it can be left or cut away in the operation which grooves that face.

The heel 17 of the block is formed with an inclined rearwardly disposed face 18 disposed at approximately 45° to the horizontal and rising from the base to or near the center of the block. The heel if left with its feather edge comprises approximately one-third of the base of the block and therefore it will project materially beyond the rear vertical face 14 of the block and also beyond the overhanging tread face of the tire 19 of a wheel when in engagement with the loading block. This provides ample stock in the heel to receive the nails and carries the heel far enough back of the block's highest bearing point against the tire to give the block a high resistance to any tendency to turn over responsive to an endwise thrust from the car.

Heretofore, as in the case of loading blocks manufactured in accordance with the Hice Patent No. 1,459,055, it will be observed that there is considerable toe left on the block which would project forward of the face 15 of my improved block. If the toe is provided it will merely require additional timber stock to produce it without increasing the chocking efficiency of the block as it will be apparent that the chocking action is derived not from that portion of the block which lies under the wheel tire but by the extent to which the block rises to a height above the floor level and is braced in front of the wheel. I therefore obtain an improved and superior block from less stock by eliminating this toe portion of the stock billet and shifting the stock thus saved to the heel portion of the block, and I am able to accomplish this end by cutting the billets in relatively inverted position and back to face from the timber stock.

In view of a divisional requirement the subject matter of this application is confined to the novel method of cutting out block blanks, the finished blocks forming the subject matter of a companion application, Serial No. 626,819, filed the 30th day of July, 1930.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. The herein described method of producing loading blocks, which consists in cross-cutting timber stock, having in transverse cross-section dimensions corresponding to the width and height of the loading block, by means of intersecting angularly disposed saw kerfs entering from opposite faces of the stock, each pair of intersecting kerfs forming a complete end face on each of a pair of relatively inverted loading block billets, such end faces being the front face of one and the rear face of the other of said billets.

2. The herein described method of producing loading blocks from timber stock having its transverse dimensions corresponding to the width and height of the loading blocks, which consists in sawing said stock to form intersecting angularly disposed kerfs leading from opposite faces of the timber stock, each pair of intersecting kerfs forming a complete cross-cut, and the successive cross-cuts being similar but inversely arranged to define each a front and a rear end face of adjacent relatively inverted loading block billets.

3. The herein described method of forming loading blocks, which consists in sawing spaced kerfs normal to the long axis of the timber stock from opposite faces of the stock approximately to the center thereof, these parallel kerfs being in equi-distant staggered relationship, and sawing oblique kerfs each intersecting with one of said normal kerfs, said oblique kerfs entering from opposite faces of the stock and being staggered and each oppositely inclined to the adjacent oblique kerfs.

4. The method of sawing timber stock to form chock block billets, which consists in cutting kerfs in one face to form two groups of alternating different cuts, similarly treating the opposite face, each kerf in a group of like kerfs along one face being disposed to intersect with a dissimilar kerf in a group of kerfs along the other face, thereby to subdivide the stock into like block blanks without waste.

5. The method of producing block billets, which consists in transversely sawing timber stock from opposite sides to produce at spaced intervals lengthwise thereof angularly disposed intersecting kerfs forming alternately inverted similar angled cross-cuts with their included angles similar and facing toward the same end of the timber, the successive kerfs cut from the same side of the timber alternately varying in length and in angular relationship to said side of the timber.

6. The method of producing chock block billets, according to claim 5, in which each cross-cut is formed by two intersecting kerfs differing relatively in length, each cross-cut being similar but inverted with respect to the adjacent cross-cuts.

7. The method of producing chock block billets, according to claim 5, in which each cross-cut is formed by two intersecting kerfs differing relatively in length and with the shorter kerf forming a less obtuse angle with the adjacent face of the stock than the longer kerf forms with the opposite stock face.

HENRY H. HOUSTON.